United States Patent [19]
Nakagawa

[11] 3,917,496
[45] Nov. 4, 1975

[54] PROPELLANT COMPOSITIONS CONTAINING EPOXY FUNCTIONAL POLYMER HAVING A SATURATED BACKBONE

[75] Inventor: Toshio William Nakagawa, San Jose, Calif.

[73] Assignee: United Technologies Corporation, East Hartford, Conn.

[22] Filed: Mar. 12, 1971

[21] Appl. No.: 123,859

[52] U.S. Cl. ............. 149/19.6; 149/19.91; 149/44; 149/76; 260/78.4 EP; 260/78.5 T
[51] Int. Cl.² ........................................... C06D 5/06
[58] Field of Search ..... 149/19, 76, 44, 19.6, 19.91; 260/78.4 EP, 78.5 T, 88.3 A

[56] References Cited
UNITED STATES PATENTS

| | | | |
|---|---|---|---|
| 3,268,477 | 8/1966 | Mueller | 260/47 |
| 3,346,546 | 10/1967 | Beach et al. | 149/19 X |
| 3,427,351 | 2/1969 | Nakagawa et al. | 149/19.91 |
| 3,454,436 | 7/1969 | Bedell | 149/19 |
| 3,586,552 | 6/1971 | Potts et al. | 149/19 |
| 3,734,786 | 5/1973 | Walden et al. | 149/19.91 |

Primary Examiner—Carl D. Quarforth
Assistant Examiner—E. A. Miller
Attorney, Agent, or Firm—Steven F. Stone

[57] ABSTRACT

A polymer having a saturated backbone of the repeating functional group:

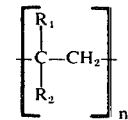

wherein $R_1$ and $R_2$ are selected from lower alkyl groups containing from 1–10 carbon atoms (preferably one carbon atom) the polymer having functional epoxy groups apended to the opposite ends thereof. The polymer is capable of undergoing an all epoxy cure to produce a binder particularly usable in the fabrication of solid propellants.

7 Claims, No Drawings

PROPELLANT COMPOSITIONS CONTAINING EPOXY FUNCTIONAL POLYMER HAVING A SATURATED BACKBONE

BACKGROUND OF THE INVENTION

U.S. Pat. No. 3,427,351 discloses saturated polymers having a backbone of the repeating structural formula:

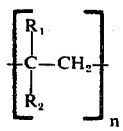

wherein $R_1$ and $R_2$ are lower alkyl groups containing from 1–10 carbon atoms. The carboxyterminated polymer may be represented by the following formula:

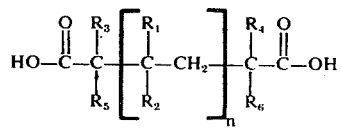

wherein $R_3$, $R_4$, $R_5$, and $R_6$ are selected from the group consisting of hydrogen and lower alkyl groups and n is an integer from approximately 4 to 250. As a result of the saturated nature of the backbone of this polymer, crosslinked compositions thereof exhibit a high degree of oxidative resistance and desirable mechanical properties in terms of rupture stress and strain making them particularly suitable for use in the preparation of solid propellants in which an oxidizing agent is dispersed throughout a cured polymeric matrix. To fully utilize the desirable properties of this backbone structure, one would like to obtain extremely high solids loadings in the propellants formed therefrom as well as to be able to utilize an epoxy curing system rather than the expensive and oxidation prone aziridinyl curing system now employed. Unfortunately, as a result of the intermolecular association of the carboxy groups of the polymer, the above compositions exhibit relatively high viscosities which impose limitations on the solids loadings of the particulate material which can be obtained for a castable system. Further, commercially available polyfunctional epoxy curing agents do not exhibit the degree of solubility in the polymer necessary to obtain an all epoxy cure. According to this invention, however, a polymer is provided having the above described saturated backbone structure and having functional epoxy groups apended at both ends. This polymer retains the desired oxidative resistance and mechanical properties associated with the saturated backbone structure but, in addition, exhibits a substantially lower viscosity than the corresponding carboxyterminated polymer and exhibits sufficient solubility for trifunctional acid crosslinking agents to permit the attainment of an all epoxy cure.

Accordingly, it is an object of this invention to provide a polymer with a saturated backbone having epoxy functional groups at both ends thereof.

It is another object of this invention to provide a curable composition containing a particulate oxidizing agent and an epoxyterminated saturated polymer.

It is another object of this invention to provide a solid propellant composition having a saturated backbone structure.

These and other objects of the invention will be readily apparent from the following description.

DESCRIPTION OF THE INVENTION

Broadly speaking, the polymers of this invention constitute a saturated backbone structure comprising the repeating structural formula:

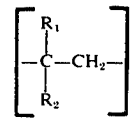

wherein $R_1$ and $R_2$ are lower alkyl groups having from 1–10 carbon atoms. Since the preferred repeating unit is the isobutylene unit in which $R_1$ and $R_2$ are methyl groups, the following description will, for convenience, relate to the polyisobutylene species; however, it is recognized that the following description is applicable to the other polymers within the above generic class.

According to the invention, both ends of the polyisobutylene backbone have apended thereto functional epoxy groups. These functional epoxy groups need not necessarily be at the extreme portions of the molecule, but it is preferred that the epoxy groups be nonglycidal. Accordingly, the polymers of the invention may be considered to have the following formula:

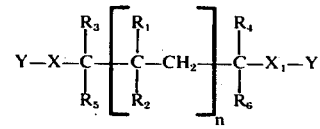

wherein $R_1$ and $R_2$ are selected from the group consisting of lower alkyl groups containing from 1–10 carbon atoms, $R_3$, $R_4$, $R_5$, and $R_6$ are selected from the group consisting of hydrogen and lower alkyl groups containing from 1–10 carbon atoms, X is selected from the group consisting of

and

and $X_1$ is the mirror image of X, Y is selected from the group consisting of saturated cyclic and acyclic groups containing from 2–10 carbon atoms two of which are included in a nonglycidal epoxy group, and n is an integer from 4–250.

Various synthesis techniques for producing the compounds of this invention are known to the art, the preferred synthesis being an esterification of the corresponding carboxyterminated compound with a singly unsaturated alcohol followed by oxidation of the unsaturated bond to an epoxy group according to the following general equation in which 1, 2, 5, 6 tetrahydrobenzyl alcohol is employed as a representative unsaturated alcohol:

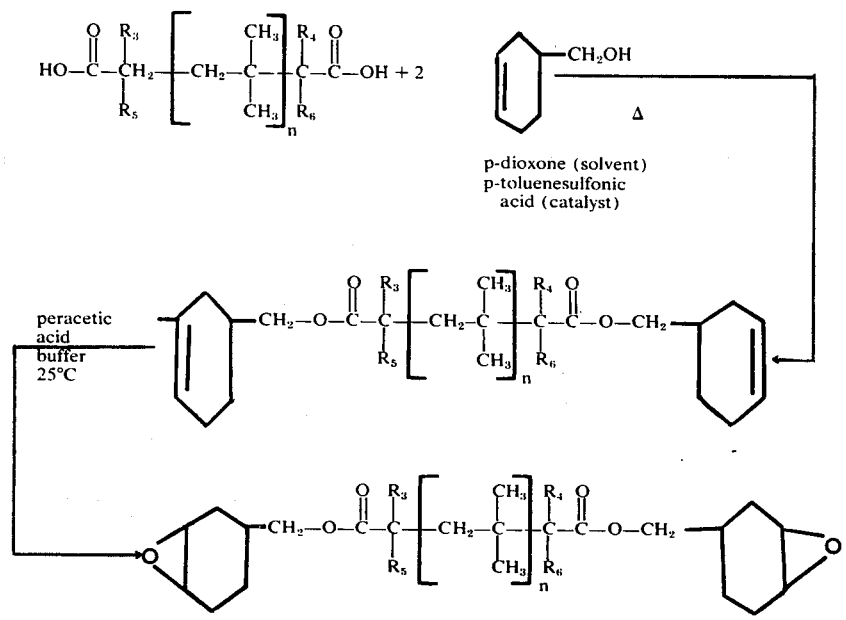

Suitable alcohols include both the cyclic and noncyclic unsaturated alcohols such as 1, 2, 5, 6 tetrahydrobenzyl alcohol, hexene-5-ol-2, allyl alcohol, crotyl alcohol, 5-hexenol-2, 3-butenol-1, 4-pentenol-1, and undecylenyl alcohol, for example.

A reverse synthetic approach could be the esterification of hydroxyterminated polyisobutylene with a singly unsaturated acid, according to the following general equation:

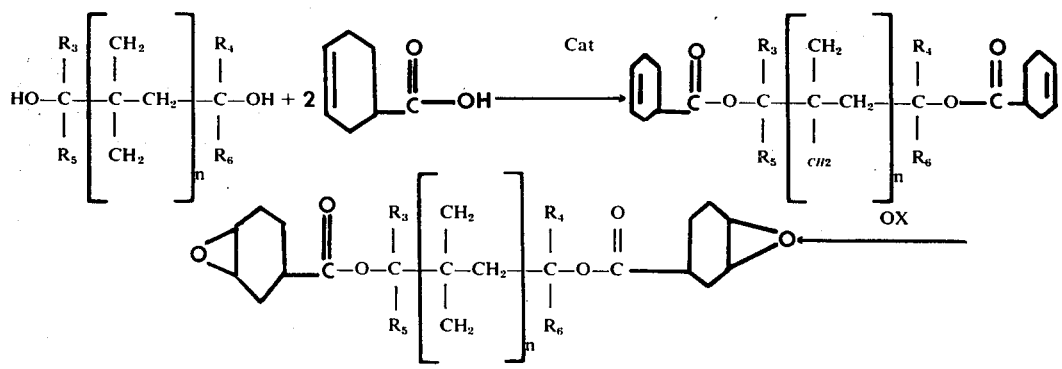

Suitable acids in addition to tetrahydrobenzyl are allylacetic acid or 10-undecylenic acid, for example.

The epoxy functional compound of this invention exhibit a substantially lower viscosity than the corresponding carboxy functional compounds and also exhibit solubility with typical trifunctional acid crosslinking agents such as Empol 1040 Trimer Acid a trimeric acid, Empol 1043, a mixed di-tribasic acid, and 1, 2, 3- propanetricarboxylic acid, nitrilotriacetic acid, aconitic acid, and 1, 3, 5 pentanetricarboxylic acid, for example, which permit the obtaining of an all epoxy cure system.

The epoxy functional polymers of this invention are compatible with such particulate oxidizing agents as ammonium perchlorate, nitronium perchlorate, hydroxylamine perchlorate, ammonium nitrate, and potassium nitrate, for example. These polymers are also compatible with nonoxidizing components of solid propellants such as the aluminum and magnesium fuels, combustion catalysts, such as ferrocene and its derivatives and iron oxide as well as with various plasticizers such as dioctyladipate which are conventionally used in the solid propellant art. Accordingly, the epoxy functional polymers are particularly suitable for the formation of solid propellants and solids loadings of as high as 80% by weight have been attained therewith.

EXAMPLE I

A one liter round bottom boiling flask with a reflux condenser was charged with 250 grams of carboxyterminated polyisobutylene (equivalent weight approximately 1,000), 850 grams (7.6 equivalents) of tetrahydrobenzyl alcohol, 25 grams p-toluenesulfonic acid, one liter of p-dioxane and 3 grams of ionol. The reaction mixture was heated in an oil bath and refluxed for three days. The reaction mixture was cooled and stripped of solvent on a rotary evaporator to produce approximately 175 grams of the diester of tetrahydrobenzyl alcohol and carboxyterminated polyisobutylene. The 175 grams of the diester were then placed in a reactor fitted with a thermometer, stirrer, and dropping funnel, together with 500 milliliters of methylene chloride, and 106 grams of sodium carbonate. The reaction mixture was cooled to 20°C and maintained at this temperature while 75 grams of peracetic acid (FMC, 41% by weight) treated with 2 grams of sodium acetate was slowly added dropwise to the reaction mixture over a one hour period. The reaction mixture was stirred for an additional hour then washed with an aqueous saturated salt solution. The methylene chloride solution of the crude product was dried overnight over sodium sulphate and magnesium sulphate. The product was stripped of solvent on a rotary evaporator and finally on a wiped film evaporator at 75°C and 50 microns pressure. The epoxyterminated polyisobutylene so produced had the following properties.

$\overline{E}$ = 1350 grams per equivalent
$\overline{M}$ = 2180 grams per mole
F = 1.62

Viscosity — 1030 poise at 35°C, 565 poise at 45°C, and 277 poise at 55°C For purposes of comparison, the viscosity of the corresponding carboxy-functional polymer is 3210 poise at 35°C and the corresponding hydroxyterminated polymer is 1580 poise at 35°C.

EXAMPLE II

A gum stock was prepared from the material produced according to Example I having the following composition:

| Material | Weight (gm) |
|---|---|
| Product of Example I | 6.76 |
| Empol 1043* | 1.80 |
| Chromic-2-ethyl hexanoate (C2EH) | 0.05 |
| MRPX** | 0.96 |

\* Emery Chemical Company
\*\* Shell Development Company

The formulation had a gel time at 90°C of 3.5 hours. In addition, the mixture was a homogeneous fluid prior to cure. In contrast, when the corresponding carboxyterminated polyisobutylene is mixed with conventional trifunctional epoxy curing agents, a nonhomogeneous mixture is produced.

EXAMPLE III

The polymer produced according to the process of Example I was used to form a solid propellant binder by mixing the polymer Empol 1043 Trimer Acid on a crosslinking agent equivalent basis with 0.1% by weight of C2EH cure catalyst. The solid propellant had 80% by weight of particulate ammonium perchlorate dispersed in the binder. The mixture was fluid and was cast in two motors and cured for four days at 160 F. Thereafter the solid propellant rocket motors were fired at 600 and 700 psi and gave burning rates of 0.187 and 0.204 inches per second respectively.

While this invention has been described with respect to specific embodiments thereof, it should not be construed as being limited thereto. Various modifications will be obvious to workers skilled in the art and can be made without departing from the scope of this invention which is limited only by the following claims wherein:

I claim:

1. A crosslinkable polymer composition comprising a compound having the structure:

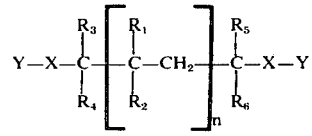

wherein $R_1$ and $R_2$ are selected from the group consisting of lower alkyl groups containing from 1–10 carbon atoms, $R_3$, $R_4$, $R_5$, and $R_6$ are selected from the group consisting of hydrogen and lower alkyl groups containing from 1–10 carbon atoms, X is selected from the group consisting of

and

and $X_1$ is the mirror image of X, Y is selected from the group consisting of saturated cyclic and acyclic groups containing from 2–10 carbon atoms, two of which are included in a nonglycidal epoxy group, and n is an integer from 4–250, and a solid particulate oxidizing agent dispersed therethrough.

2. The composition of claim 1 further comprising a trifunctional acid curing agent.

3. A solid propellant composition comprising the crosslinked product obtained upon the curing of the composition of claim 2.

4. The composition of claim 1 wherein $R_1$ and $R_2$ are methyl groups.

5. The composition of claim 1 wherein Y is a cyclic epoxide having the following structure

6. The composition of claim 5 wherein $R_1$ and $R_2$ are methyl groups.

7. The composition of claim 1 wherein said oxidizing agent is ammonium perchlorate.

* * * * *